(12) United States Patent
Niclout et al.

(10) Patent No.: US 6,984,258 B2
(45) Date of Patent: Jan. 10, 2006

(54) METHOD AND APPARATUS FOR TREATING A GAS BY ADSORPTION IN PARTICULAR FOR PURIFYING ATMOSPHERIC AIR

(75) Inventors: Norbert Niclout, Archettes (FR); Marc Wagner, Saint Maur des Fosses (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 10/492,491

(22) PCT Filed: Oct. 9, 2002

(86) PCT No.: PCT/FR02/03433

§ 371 (c)(1),
(2), (4) Date: Apr. 9, 2004

(87) PCT Pub. No.: WO03/031027

PCT Pub. Date: Apr. 17, 2003

(65) Prior Publication Data

US 2004/0244594 A1  Dec. 9, 2004

(30) Foreign Application Priority Data

Oct. 9, 2001  (FR) .................................. 01 12968

(51) Int. Cl.
*B01D 53/04* (2006.01)
*B01D 53/26* (2006.01)

(52) U.S. Cl. ............................ 95/115; 62/641; 62/644; 95/120; 95/125; 95/139; 96/130; 96/142; 96/143; 96/146

(58) Field of Classification Search ................... 95/99, 95/106, 114, 115, 117–120, 122–126, 139; 96/108, 130, 134, 142–144; 62/640, 641, 62/643, 644
See application file for complete search history.

(56) References Cited

U.S. PATENT DOCUMENTS

| 2,882,998 | A | * | 4/1959 | Grenier ........................ 62/641 |
| 3,800,507 | A | * | 4/1974 | Howell et al. ................ 95/122 |
| 4,557,735 | A | * | 12/1985 | Pike .............................. 95/99 |
| 4,698,073 | A | * | 10/1987 | Rohde et al. ................. 95/123 |
| 5,453,112 | A | * | 9/1995 | Sinicropi et al. .............. 95/41 |
| 5,570,582 | A | * | 11/1996 | Sweeney et al. ............. 62/641 |
| 5,593,475 | A | | 1/1997 | Minh |
| 5,614,000 | A | * | 3/1997 | Kalbassi et al. ............... 95/96 |
| 5,647,891 | A | * | 7/1997 | Blizzard et al. ............... 95/99 |
| 5,661,987 | A | * | 9/1997 | Zarate ......................... 62/641 |

(Continued)

FOREIGN PATENT DOCUMENTS

EP  0 456 575 A  11/1991

(Continued)

OTHER PUBLICATIONS

International Search Report for PCT/FR02/03433.

*Primary Examiner*—Robert H. Spitzer
(74) *Attorney, Agent, or Firm*—Linda K. Russell; Elwood Haynes (57) ABSTRACT

Method and apparatus for treating a gas by adsorption. A gas is compressed and then treated by being circulated in an adsorber. A regenerating fluid is indirectly heated by the gas coming from the compressor. In a second regeneration phase, the regenerating fluid is sent directly to the adsorber, while the treated gas is refrigerated by an auxiliary refrigerator.

15 Claims, 3 Drawing Sheets

U.S. PATENT DOCUMENTS 5,846,295 A * 12/1998 Kalbassi et al. .............. 95/105
6,155,078 A * 12/2000 Miyashita et al. ............ 62/643
6,321,566 B1 * 11/2001 Yamamoto et al. ........... 62/643
6,572,681 B1 * 6/2003 Golden et al. ................ 95/122
2001/0015069 A1 * 8/2001 Miura et al. ................. 62/50.2

FOREIGN PATENT DOCUMENTS

EP  1 035 391 A  9/2000

* cited by examiner

METHOD AND APPARATUS FOR TREATING A GAS BY ADSORPTION IN PARTICULAR FOR PURIFYING ATMOSPHERIC AIR

BACKGROUND OF THE INVENTION

1. Field of the Invention

The present invention relates to a device and to a process for treating a gas by adsorption.

2. Related Art

The present invention relates to a device and to a process for treating a gas by adsorption in an adsorber, of the type comprising the steps consisting in:

(a) compressing the gas to be treated;
(b) making the gas to be treated coming from step (a) flow through an adsorber in adsorption phase; and
(c) making a stream of regeneration fluid flow through the adsorber in the regeneration phase, and
(c1) during a first part of the adsorber regeneration phase, indirect heat exchange between, on the one hand, the gas to be treated coming from step (a) and, on the other hand, the refrigeration fluid stream is established in a heat exchanger so as to cool the gas to be treated coming from step (a) and intended for step (b) and to heat the regeneration fluid intended for step (c);
(c2) during a second part of the adsorber regeneration phase, the regeneration fluid is made to flow through the adsorber without making it undergo the heat exchange of step (c1); and
(d) auxiliary refrigeration of the gas to be treated during said step (c2) is carried out.

A method of this type is known from U.S. Pat. No. 5,593,475.

The invention applies in particular to the separation of atmospheric air by distillation, said separation comprising an air compression step with a view to a subsequent step of cooling this air, and a step of stripping water and carbon dioxide from said air by flowing through an adsorber for the purpose of preventing the formation of ice and/or dry ice in the heat exchanger that brings the air to the cryogenic distillation temperatures.

When the gas treatment process in question is not carried out on an occasional basis but is intended, on the contrary, to be repeated or even operated continuously, the adsorber must be periodically regenerated.

For this purpose, it is known to use a regeneration gas that is made to flow through the adsorber. At least two adsorbers are then used, which switch alternately between an adsorption phase and a regeneration phase.

In the intended application, the cryogenic distillation produces a waste gas that is dry and decarbonated, and consequently capable of regenerating the adsorber.

The available mean flow rate of regeneration fluid may be limited. It may also be desirable to intentionally limit the consumption of regeneration fluid.

It is also known to improve the regenerability of the regeneration fluid by heating it, for example by electrical heating means or by steam, before making it flow through the adsorber.

However, this solution is expensive as it consumes energy.

To reduce the amount of energy consumed and/or the amount of regeneration fluid consumed, for the same result in terms of quantity and treatment quality of the heated gas, EP-A-0 456 575 proposes (FIG. 3) a process of the aforementioned type in which there is heat exchange between the compressed gas and the regeneration fluid for the adsorber.

It is an object of the invention to improve this known process in order to allow it to carry out regeneration in two successive steps, one with heated regeneration fluid, without adding a further exchanger, the other with unheated regeneration fluid.

SUMMARY OF THE INVENTION

A process and apparatus for treating a gas by adsorption wherein additional heat is provided to the regeneration fluid by external means prior to its use in the regeneration process.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

For this purpose, the subject of the invention is a treatment process of the aforementioned type, characterized in that the process furthermore includes a step consisting in additionally heating the regeneration fluid coming from step (c1) by means of an auxiliary heat injection, before this regeneration fluid is made to pass through the adsorber.

According to other features of this process:

said auxiliary refrigeration step (d) consists in refrigerating the gas to be treated by an auxiliary cold source;

said auxiliary refrigeration step (d) consists in refrigerating the gas to be treated by at least one part of the stream of regeneration fluid that has passed through the adsorber;

said auxiliary refrigeration is carried out in the heat exchanger;

said refrigeration is carried out outside the heat exchanger;

a flow of gas to be treated and of regeneration fluid is maintained in the heat exchanger during said auxiliary refrigeration step (d);

the process furthermore includes a step consisting in additionally cooling the gas to be treated coming from step (c1), before this gas to be treated is made to pass through the adsorber;

the gas to be treated is atmospheric air, the function of step (b) is to strip water and carbon dioxide from the air to be treated coming from step (a), said process includes an additional step consisting in separating the air coming from step (b) by distillation in order to produce at least one of its constituents and also a waste gas, and the waste gas forms said regeneration fluid.

The subject of the invention is also an apparatus for treating a gas by adsorption, of the type comprising:

a compressor for compressing the gas to be treated, the delivery side of which compressor is designed to be connected to the inlet of at least one adsorber during an adsorption phase of the latter;

means for making a regeneration fluid flow through the adsorber during a regeneration phase of the latter; and means for heating the regeneration fluid entering the adsorber in regeneration mode;

the heating means comprising a heat exchanger designed to bring the regeneration fluid into indirect heat exchange relationship with the gas coming from the compressor, the apparatus furthermore including branch-off means for sending the regeneration fluid into the adsorber in regeneration mode without passing through the heat exchanger, and auxiliary refrigerating means for refrigerating the gas to be treated when said branch-off means are activated, characterized in that the heating means furthermore comprise an auxiliary heat source (14) designed to carry out additional heating on the regeneration fluid.

Figure 1:
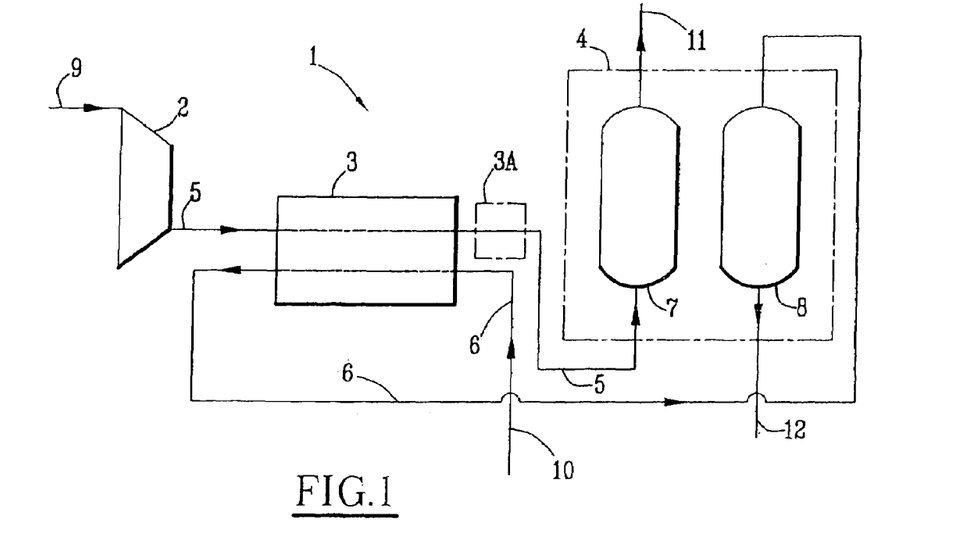
FIG. 1 illustrates an apparatus similar to that described in EP-A-0 456 575, FIG. 3.

The apparatus 1 illustrated in FIG. 1 comprises a compressor 2, a heat exchanger 3 and an adsorption unit 4. A first line 5 forms a circuit for flow of the gas to be treated, which links the compressor 2 with the exchanger 3 and the adsorption unit 4. Said line is arranged in such a way that the gas to be treated, drawn in by the compressor 2, is discharged by the latter, then passes through the exchanger 3 and then the adsorption unit 4.

A second line 6 intended to transport a regeneration fluid links the exchanger 3 with the adsorption unit 4. It is arranged in such a way that the regeneration fluid passes firstly through the exchanger 3 and then the adsorption unit 4.

The adsorption unit 4 comprises identical first and second adsorbers 7 and 8 and a switching device (not shown) which, in a first position, links, on the one hand, the first adsorber 7, then operating in adsorption mode, to the first line 5 and, on the other hand, the second adsorber 8 to the second line 6, this second adsorber 8 then being regenerated by the regeneration fluid passing through it. In a second position of the switching device, these two adsorbers 7 and 8 are switched over, the first 7 being in regeneration mode while the second 8 is in an active adsorption state.

Of course, the adsorption unit 4 may have more than two adsorbers. It may also have only one adsorber, the apparatus 1 for treating a gas by adsorption then being provided with at least one buffer volume in order to allow it to operate continuously.

In FIG. 1, the adsorption unit 4 is illustrated when the switching device is in its first position.

Advantageously, the exchanger 3 is of the countercurrent type, as may be seen in FIG. 1.

Moreover, this exchanger 3, intended to bring two gases into indirect heat exchange relationship, will usefully be of the brazed-plate type.

The regeneration fluid flows in the second line 6 so that it passes firstly through the exchanger 3 and then the adsorption unit 4.

The apparatus 1 for treating a gas by adsorption that has just been described is intended to operate continuously.

The gas to be treated enters the apparatus 1 via the inlet 9 for the gas to be treated, which corresponds to the intake of the compressor 2. It is then compressed by this compressor 2, consequently experiencing a temperature rise. Its temperature is then above that of the regeneration fluid that enters the treatment device 1 via the regeneration fluid inlet 10.

The gas to be treated and the regeneration fluid then each flow separately through the exchanger 3, during which flow they are brought into countercurrent indirect heat exchange relationship so as to heat the regeneration fluid and at the same time cool the gas to be treated.

On leaving the exchanger 3, the gas to be treated and the regeneration fluid each flow separately into the adsorption unit 4 via two different inlets. Inside the adsorption unit 4, the gas to be treated and the regeneration fluid pass through one of the respective two adsorbers 7 and 8, depending on the position of the switching device. The adsorber through which the gas to be treated flows is active and operates in adsorption mode so as to adsorb at least one particular component present in the gas to be treated. At the same time, the adsorber through which the regeneration fluid flows is itself regenerated, countercurrently with respect to the direction of flow of the gas to be treated in adsorption phase.

In a subsequent step, the two adsorbers 7 and 8 are switched over by the switching device, so that the adsorber that was in adsorption mode is regenerated, whereas the one which was in regeneration mode becomes active and adsorbs at least one particular constituent of the gas to be treated that is flowing through it.

As is known, the use of at least two adsorbers therefore allows continuous operation.

The treated gas, after having passed through one of the two adsorbers, exits the treatment apparatus 1, via an outlet 11 for the treated gas, where it is available in the compressed and adsorptively purified state.

As regards the regenerating gas, this is exhausted from the treatment apparatus 1 at 12.

Figure 2:
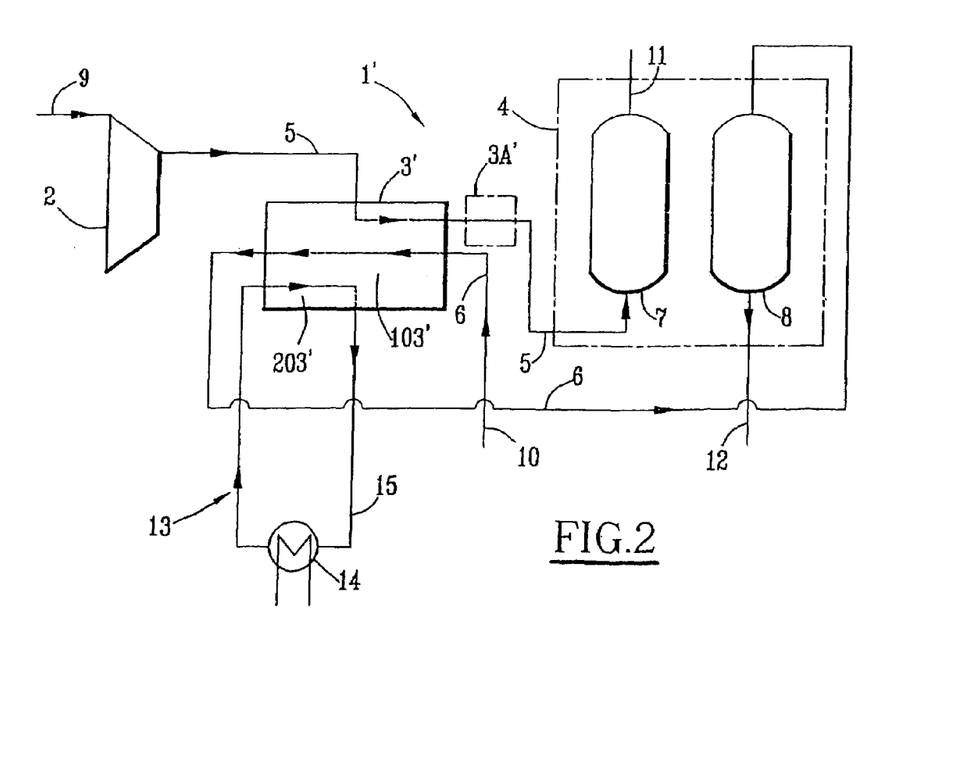
FIG. 2 illustrates a novel variant of this apparatus.

The gas treatment apparatus 1' illustrated in FIG. 2 comprises substantially the same components as the one, shown in FIG. 1, which has just been commented upon.

The exchanger 3 alone has been replaced with a triple-flow exchanger 3' that will be commented upon below. The same references are retained for the components common to these two alterative embodiments of the invention, these common components being arranged one with respect to another in the same manner in both cases.

The apparatus furthermore includes additional heating means 13 for heating the regeneration fluid.

This is because it may prove the case that the regeneration fluid is heated by heat exchange with the gas to be treated insufficiently for complete regeneration of an adsorber over the course of the entire adsorption/regeneration cycle. A first solution may consist in increasing the flow rate of the regeneration fluid. Alternatively or additionally to this first solution, the regenerability of the regeneration fluid may be increased by using said additional heating means 13.

The triple-flow exchanger 3' replaces the exchanger 3.

The additional heating means 13 comprise an auxiliary heat source 14, for example an electrical heat source, linked by a circuit 15 to the hot part of the heat exchanger 3'. The circuit 15 forms a closed loop for the flow of a heat-transfer fluid between said auxiliary heat source 14 and the exchanger 3'.

Means (not shown) move the heat-transfer fluid inside the circuit 15. Advantageously, as shown, the flow of the heat-transfer fluid through the exchanger 3' is in the opposite direction to the flow of the regeneration fluid, in order to operate as a countercurrent exchanger.

The configuration of the triple-flow exchanger 3' illustrated in FIG. 2 is such that the regeneration fluid is firstly heated by countercurrent heat exchange with just the gas to be treated, in the cold part 103' of the exchanger, and then secondly heated by countercurrent heat exchange with just the heat-transfer fluid in the hot part 203' of the exchanger.

This alternative embodiment reproduces the operation of the treatment apparatus 1 of FIG. 1, but includes an additional step in which the regeneration fluid, after having been heated by heat exchange with the gas to be treated, undergoes further heat exchange with the additional heating means 13 in order to raise its temperature even further and thus increase its regenerability. For this purpose, the heating means 14 transmit a certain quantity of heat to the heat-transfer fluid which, in turn, restores this quantity of heat to the regeneration fluid within the triple-flow exchanger 3'.

As a variant, the heating means 14 may be placed directly in the second line 6 that transports the regeneration fluid, the triple-flow exchanger 3' then reverting to a simple exchanger 3 of the type shown in FIG. 1.

In addition, in one or the other of the two embodiments that have just been commented upon, additional cooling means may be provided for cooling the gas to be treated, which means may advantageously be placed between the heat exchanger 3 or 3' and the adsorption unit 4, as indicated by the dot/dash lines at 3A and 3'A in FIGS. 1 and 2. The additional step thus obtained, of cooling the gas to be treated, then promotes the adsorption effect.

Figure 3:
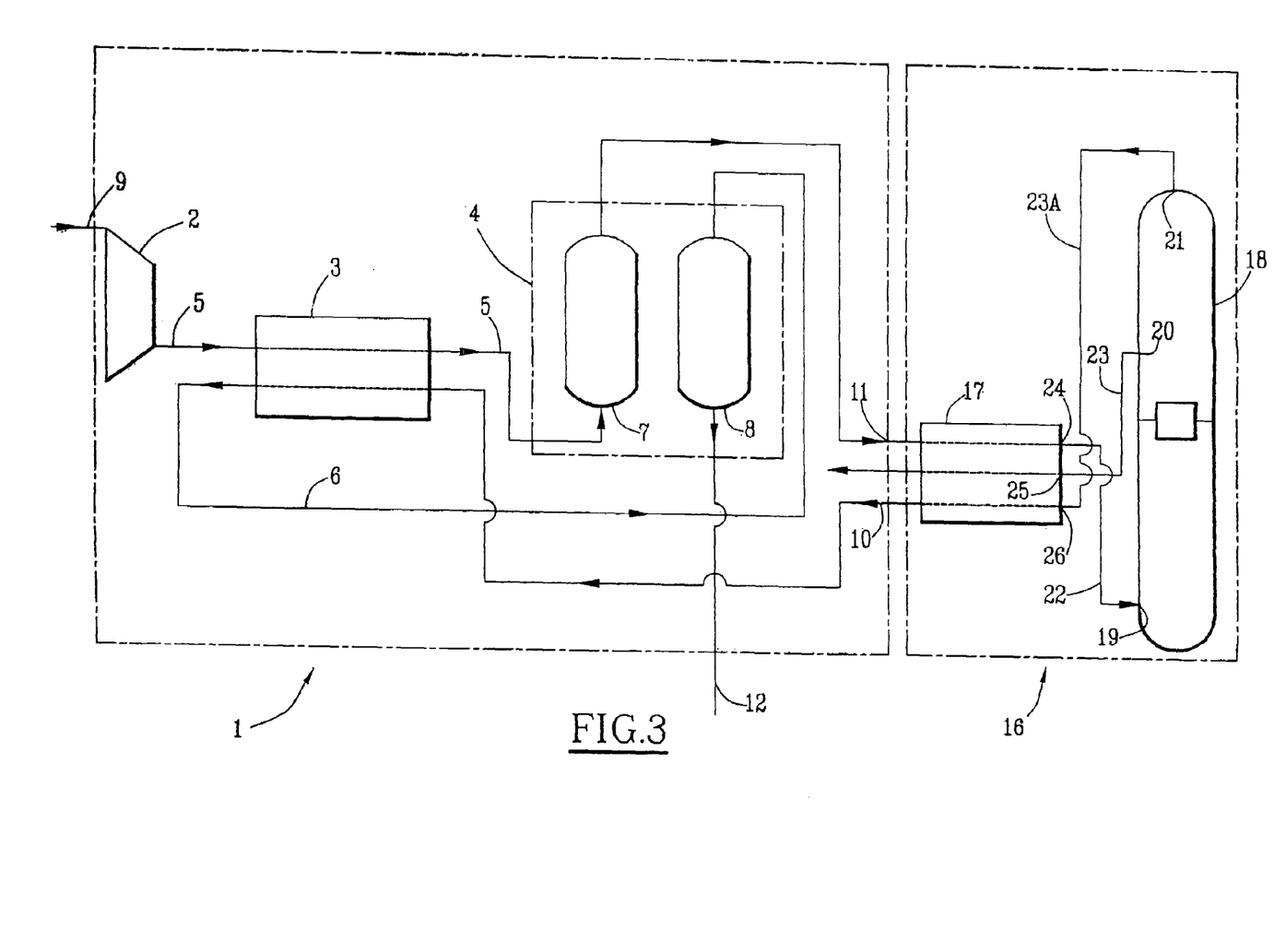
FIG. 3 illustrates a cryogenic air separation installation incorporating the apparatus of FIG. 1.

FIG. 3 shows schematically a cryogenic air separation installation for producing particularly oxygen. It incorporates, placed upstream, the treatment apparatus 1 of FIG. 1, which apparatus is connected to what is commonly referred to as the cold box 16.

Said cold box 16 comprises a countercurrent heat exchange line 17 and a double distillation column 18. The double column 18 has an inlet 19, for feeding its medium-pressure column with air, an oxygen gas production outlet 20 and an outlet 21 for the waste gas (impure nitrogen), said outlet being provided on its low-pressure column. The inlet 19 and the outlets 20 and 21 are respectively linked by means of lines 22, 23 and 23A to the air outlet 24, to the oxygen inlet 25 and to the waste gas inlet 26 at the cold end of the exchanger 17. The other parts of the cold box 16, known per se, have not been shown.

The inlet 9 of the treatment apparatus 1 is linked to an atmospheric air intake. The outlet 11 of this same apparatus 1, which delivers compressed, dry and decarbonated air, is linked to that one of the inlets of the exchanger 17, at the hot end of the latter, which communicates with the outlet 24.

The waste gas, which leaves the double column 18 via 23, is, as is known, at a slight overpressure, which allows it to pass through a certain number of components in which its pressure decreases until the gas is finally discharged into the atmosphere. On leaving the exchanger 17, the waste gas 19 has the qualities of a regenerating gas insofar as it is dry, decarbonated and depressurized. Thus, the outlet of the exchanger 17 via which the waste gas escapes is linked to the inlet 10 for the regeneration gas of the treatment apparatus 1, the waste gas being used as regeneration fluid. It should be noted at this point that the waste gas is at a temperature below that of the air leaving the compressor 2. Thus, as it passes through the exchanger 3, it will be heated, this having the effect of increasing its regenerability.

The operation of the treatment apparatus 1 thereafter remains unchanged.

The flow of the fluids within the cryogenic air separation installation that has just been commented upon is caused by the driving pressure produced by the compressor 2.

It will firstly be noted that, by placing the adsorber in the path of the gas to be treated after the compressor, the adsorption effect is promoted because this gas to be treated has been compressed. However, the temperature rise of this gas to be treated owing to this compression would have the effect of reducing the adsorption efficiency.

By introducing a heat exchanger 3 whose purpose is, on the one hand, to increase the temperature of the regeneration fluid and, on the other hand, to reduce the temperature of the gas to be treated, it is possible particularly inexpensively to increase the efficiency of the adsorption/regeneration cycle in two ways. This is because the increase in the temperature of the regeneration fluid promotes regeneration of the adsorber, and adsorption efficiency is improved owing to the cooling of the gas to be treated during its passage through the exchanger 3.

As a variant, the exchanger 3 or 3' may be a cross-current exchanger, which allows better optimization of the pipework and/or the head losses and/or the discharge of condensates.

Figure 4:
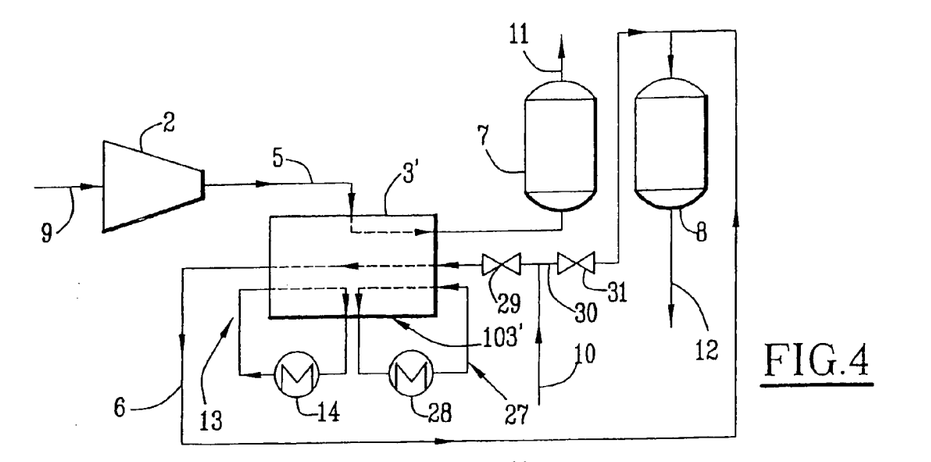
FIGS. 4 to 6 illustrate three alternative embodiments of the apparatus according to the invention.

FIG. 4 shows a treatment apparatus according to the invention that differs from that of FIG. 2 in two aspects.

Firstly, the cold part 103' is provided with an auxiliary refrigerating circuit 27, which is itself refrigerated by an external cold source 28. In this circuit, the refrigerating fluid flows countercurrently with the gas to be treated.

Secondly, the line 10 is provided, before its inlet at the cold end of the exchanger 31, with a valve 29 and, upstream of said valve, a branch 30 that leads to the upper opening on one or other of the adsorbers 7 and 8 and is equipped with a valve 31.

When the adsorber in regeneration mode (in this case, the adsorber 8) has to be coursed by hot regeneration fluid, the valve 31 is closed, the valve 29 is open, the refrigerating circuit 27 is not in service and the heating circuit 13 is in service. The operation is then identical to that described above with regard to FIG. 2.

When, in a subsequent phase of the regeneration of the adsorber 8, the latter must be coursed by cold regeneration fluid, the valves 29 and 31 are reversed so that the regeneration fluid passes directly into the adsorber via the line 30.

At the same time, the heating circuit is closed off and the refrigerating circuit 27 is brought into service. Thus, it is the latter circuit that refrigerates the compressed air flowing through the exchanger 3'.

In this way, the thermal operation of the exchanger 3' varies little, thereby reducing thermal fatigue effects, especially if the exchanger is of the type with brazed aluminum plates.

Figure 5:
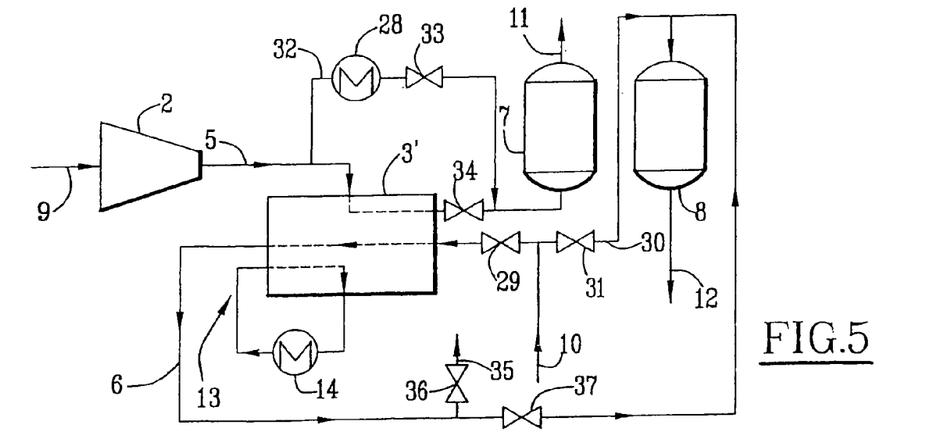

The embodiment shown in FIG. 5 differs from the previous one by the refrigerating circuit 27 being omitted and by the cold source 28 being installed on a branch-off 32 of the line 5, starting upstream of the exchanger 3' and reemerging downstream thereof. This branch-off is equipped with a valve 33, and another valve 34 is added to the line 5 between the cold end of the exchanger 3' and the outlet of the branch-off 32. In addition, a line 35 is tapped off the line 6. Two valves 36 and 37, provided in the lines 35 and 6 respectively, are used to direct the regeneration fluid coming from the exchanger 3' either to the adsorber in regeneration mode or to the discharge point.

Thus, when it is the cold regeneration fluid that flows through the adsorber 8 in regeneration mode, the valve 34 is closed, whereas the valve 33 is open, in such a way that the air is cooled by the cold source 28. To achieve the same advantage of reducing thermal fatigue of the exchanger as in the case of FIG. 4, during regeneration of the adsorber 8 by cold regeneration fluid, a small flow of gas to be treated and of regeneration fluid is maintained through the exchanger 3', the latter being discharged via the line 35, by operating the valves 36 and 37.

Figure 6:
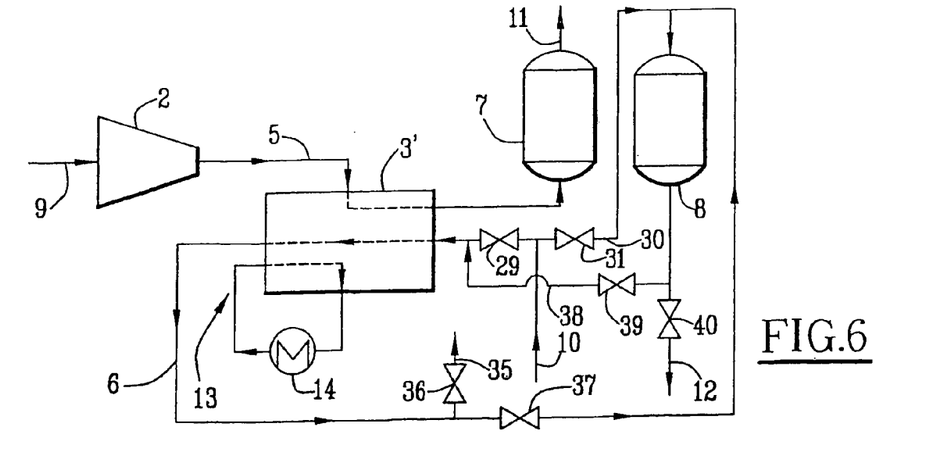

The embodiment shown in FIG. 6 differs from the previous one firstly by the omission of the components 28, 32, 33 and 34 and secondly by the addition of a line 38 that links the line 12 to the cold end of the refrigerating fluid passage of the exchanger 3'. This line 38 is equipped with a valve 39, and another valve 40 is provided in the line 12 downstream of the line 35.

In this embodiment, when it is the cold regeneration fluid that flows through the adsorber 8 in regeneration mode, the valve 40 is closed and the valve 39 opened, in such a way that the regeneration fluid leaving the adsorber flows through the exchanger 3'. As previously, this flow serves to cool the compressed gas to be treated, which is then discharged via the line 35.

In the same way as in the case of FIGS. 4 and 5, this reduces thermal fatigue effects in the exchanger.

In FIGS. 4 to 6, the apparatus furthermore includes additional heating means 13 for heating the regeneration fluid.

This is because it may prove the case that the regeneration fluid is heated by heat exchange with the gas to be treated insufficiently for complete regeneration of an adsorber over the course of the entire adsorption/regeneration cycle. A first solution may consist in increasing the flow rate of the regeneration fluid. Alternatively or additionally to this first solution, the regenerability of the regeneration fluid may be increased by using said additional heating means 13.

The triple-flow exchanger 3' replaces the exchanger 3 in FIG. 1.

The additional heating means 13 comprise an auxiliary heat source 14, for example an electrical heat source, linked by a circuit 15 to the hot part of the heat exchanger 3'. The circuit 15 forms a closed loop for the flow of a heat-transfer fluid between said auxiliary heat source 14 and the exchanger 3'.

Means (not shown) move the heat-transfer fluid inside the circuit 15. Advantageously, as shown, the flow of the heat-transfer fluid through the exchanger 3' is in the opposite direction to the flow of the regeneration fluid, in order to operate as a countercurrent exchanger.

The configuration of the triple-flow exchanger 3' illustrated in FIGS. 4 to 6 is such that the regeneration fluid is firstly heated by countercurrent heat exchange with just the gas to be treated, in the cold part 103' of the exchanger, and then secondly heated by countercurrent heat exchange with just the heat-transfer fluid in the hot part 203' of the exchanger.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for treating a gas by adsorption in an adsorber, comprising:
   a) compressing a gas to be treated;
   b) making the gas to be treated from step (a) flow through an adsorber in adsorption phase;
   c) making a stream of regeneration fluid flow through the adsorber in a regeneration phase;
      c1) during a first part of the adsorber regeneration phase, indirect heat exchange between the gas to be treated from step (a) and a regeneration fluid stream is established in a heat exchanger so as to cool the gas to be treated from step (a) and intended for step (b) and to heat the regeneration fluid intended for step (c), and
      c2) during a second part of the adsorber regeneration phase, the regeneration fluid is made to flow through the adsorber without making it undergo the heat exchange of step (c1); and
   d) performing auxiliary refrigeration of the gas to be treated during said step (c2); and
   heating the regeneration fluid coming from step (c1) by means of an auxiliary heat injection before this regeneration fluid is made to pass through the adsorber.

2. The process as claimed in claim 1, wherein said auxiliary refrigeration step (d) further comprises refrigerating the gas to be treated by an auxiliary cold source.

3. The process as claimed in claim 1, wherein said auxiliary refrigeration step (d) further comprises refrigerating the gas to be treated by at least one part of the stream of regeneration fluid that has passed through the adsorber.

4. The process as claimed in claim 1, wherein said auxiliary refrigeration is carried out in the heat exchanger.

5. The process as claimed in claim 1, wherein said indirect heat exchange is carried out outside the heat exchanger.

6. The process as claimed in claim 5, wherein a flow of the gas to be treated and of the regeneration fluid is maintained in the heat exchanger during said auxiliary refrigeration step (d).

7. The process as claimed in claim 1, further comprising cooling the gas to be treated from step (c1), before this gas to be treated is made to pass through the adsorber.

8. The process as claimed in claim 1, wherein the gas to be treated is atmospheric air, in that the function of step (b) is to strip water and carbon dioxide from the air to be treated coming from step (a), in that said process further comprises separating the air from step (b) by distillation in order to produce at least one of its constituents and also a waste gas, and in that the waste gas forms said regeneration fluid.

9. An apparatus for treating a gas by adsorption, comprising:
   a compressor for compressing a gas to be treated, the delivery side of the compressor is designed to be connected to the inlet of at least one adsorber during an adsorption phase of the latter;
   a means for making a regeneration fluid flow through the adsorber during a regeneration phase of the latter; and
   a means for heating the regeneration fluid entering the adsorber in regeneration mode, wherein:
   a) the heating means comprises a heat exchanger designed to bring the regeneration fluid into indirect heat exchange with the gas coming from the compressor;
   b) the apparatus further comprises:
      1) a branch-off means for sending the regeneration fluid into the adsorber in regeneration mode without passing through the heat exchanger and;
      2) an auxiliary refrigerating means for refrigerating the gas to be treated when said branch-off means are activated; and
   c) the heating means further comprises an auxiliary heat source designed to carry out additional heating on the regeneration fluid.

10. The apparatus as claimed in claim 9, wherein the auxiliary refrigeration means comprise an auxiliary cold source for at least the cold part of the heat exchanger.

11. The apparatus as claimed in claim 9, wherein the auxiliary refrigerating means comprise a branch-off from a circuit for gas to be treated, that branch-off being mounted across the terminals of the heat exchanger and provided with an auxiliary cold source.

12. The apparatus as claimed in claim 9, wherein the auxiliary refrigerating means comprise a return line for returning the regeneration fluid to the heat exchanger after said fluid has passed through the adsorber in regeneration mode.

13. The apparatus as claimed in claim 9, wherein the auxiliary heat source is designed to provide additional heat for at least the hot part of the heat exchanger.

14. The apparatus as claimed in claim 9, further comprising an additional cooling means for cooling the gas to be treated, these means being placed between the heat exchanger and the adsorber.

15. The apparatus as claimed in claim 9, wherein an assembly starting from the compressor to the adsorber is placed upstream of an air separation installation for producing at least one of the constituents of air by distillation, in that the adsorber is intended to strip water and carbon dioxide from the air to be treated, and in that the regeneration fluid is formed from a waste gas produced by this separation installation.

* * * * *

UNITED STATES PATENT AND TRADEMARK OFFICE
CERTIFICATE OF CORRECTION

| | |
|---|---|
| PATENT NO. | : 6,984,258 B2 |
| APPLICATION NO. | : 10/492491 |
| DATED | : January 10, 2006 |
| INVENTOR(S) | : N. Niclout et al. |

It is certified that error appears in the above-identified patent and that said Letters Patent is hereby corrected as shown below:

In Column 7, line 64, replace the word "regeneration" with the word --refrigeration--.

Signed and Sealed this

Twentieth Day of April, 2010

David J. Kappos
*Director of the United States Patent and Trademark Office*